US008299953B2

(12) United States Patent
Teuling

(10) Patent No.: US 8,299,953 B2
(45) Date of Patent: Oct. 30, 2012

(54) APPARATUS AND METHODS FOR PROCESSING REMOTE CONTROL INFORMATION

(75) Inventor: Sieme Teuling, Almelo (NL)

(73) Assignee: EchoStar Global B.V., Almelo (NL)

( * ) Notice: Subject to any disclaimer, the term of this patent is extended or adjusted under 35 U.S.C. 154(b) by 536 days.

(21) Appl. No.: 12/578,761

(22) Filed: Oct. 14, 2009

(65) Prior Publication Data

US 2010/0090878 A1 Apr. 15, 2010

(30) Foreign Application Priority Data

Oct. 14, 2008 (EP) .................................... 08166606

(51) Int. Cl.
*H04L 17/02* (2006.01)

(52) U.S. Cl. ........................................ 341/176; 341/173

(58) Field of Classification Search .................. 341/173, 341/176; 340/9.1, 9.16; 707/791, 802, 825
See application file for complete search history.

(56) References Cited

U.S. PATENT DOCUMENTS 4,626,848 A * 12/1986 Ehlers ........................ 340/12.24
4,802,114 A 1/1989 Sogame
7,889,112 B1 * 2/2011 Vergis et al. .................. 341/176
8,049,593 B2 * 11/2011 Kim et al. .................... 340/4.31
8,054,211 B2 * 11/2011 Vidal ............................ 341/176
2005/0174253 A1 8/2005 Altman

OTHER PUBLICATIONS

Extended European Search Report issued on May 26, 2009 by the European Patent Office, 8 pages.

* cited by examiner

*Primary Examiner* — Brian Young
(74) *Attorney, Agent, or Firm* — Seed IP Law Group PLLC

(57) ABSTRACT

A message transmitting signal comprised of a sequence of high level and low level pulses arranged to provide a message, such as the IR bit pattern output by a remote control device, is analysed. Distinct durations during which pulses are at a high level are formed into a first table and distinct durations during which the pulses are at low level are formed into a second table. An index is linked to the first and second tables, the index identifying the order, level and distinct duration of the pulses in the signal. The index can be categorised to identify the protocol of the message and can be used to recognise protocols and, in a universal remote control device, to generate message transmitting signals.

14 Claims, 10 Drawing Sheets

APPARATUS AND METHODS FOR PROCESSING REMOTE CONTROL INFORMATION

RELATED APPLICATIONS

This application claims the benefit of European Patent Application No. 08166606.7, entitled "UNIVERSAL REMOTE CONTROL DEVICE", filed Oct. 14, 2008, which is hereby incorporated herein by reference in its entirety.

TECHNICAL BACKGROUND

Our co-pending European patent application No. 08165844.5 filed on 3 Oct. 2008 identifies a need to provide a universal remote control unit able to control a number of different devices such as TV, a VCR, a disc player and an audio system. This co-pending application describes how to store all of the control data necessary to ensure that the functionality of the universal remote control device is not limited, but yet keeps the size of the database small so that the memory required can also be kept small. In this preceding case, a database structure is described in which common control data is stored in virtual remote structures which are available to a number of physical remote structures. The data is hierarchically arranged and inheritance is used to reduce the overall size of the data.

A remote control unit communicates with the electronic device it controls by transmitting signals which carry messages. Generally, infrared (IR) transmissions are used and, in their choice of transmission medium, there is some standardization between various manufacturers. However, although such a message transmitting signal is comprised of a sequence of high level and low level pulses, there is no standardization of the message protocols. Thus, so called universal controllers which are currently available either copy and store the exact messages output from a number of individual remote control units, or provide a lookup table in which those individual messages can be stored. The "universality" of such controllers is limited by the size of the memory in the remote control device.

OVERVIEW

According to a first aspect of the present invention there is provided a method of analysing a message transmitting signal comprised of a sequence of high level and low level pulses arranged to provide a message, the method comprising:

tabulating information about the distinct durations during which the pulses are at the high and low levels to form a table of durations for the pulses, and providing an index linked to the table to identify the order and distinct duration of the pulses in the message transmitting signal.

As a first step, embodiments of the present invention analyse each message transmission signal as defined above. In this respect, it has been appreciated that the index produced by such an analysis enables the protocol of the message to be categorised and recognised.

The invention also extends to a method of analysing a message transmitting signal comprised of a sequence of high level and low level pulses arranged to provide a message, the method comprising:

tabulating the distinct durations during which the pulses are at the high level to form a first table of durations for high level pulses, tabulating the distinct durations during which the pulses are at the low level to form a second table of durations for low level pulses, and providing an index linked to the first and second tables to identify the order, level and distinct duration of the pulses in the message transmitting signal.

In an embodiment, the distinct durations which are tabulated have tolerances applied to the distinct durations.

If the timing values are close enough, they are considered the same. The application of a tolerance to each distinct duration enables measurement errors to be discarded.

Accordingly, in an embodiment of the invention, the index is compared to known indexes to determine the protocol of the message transmitting signal and to extract the specific bits defining the message.

As is well understood, a protocol is a set of rules governing the syntax, and other features, of a message. Whilst a protocol might define very strictly each and every feature of a message, that message can also be thought to belong to an underlying protocol, or category of protocol, which, for example, defines only significant features of the message. When referring to a protocol of a message in describing and defining embodiments of the invention, it is usually the underlying, or category of protocol, which is meant. However, the invention can be used with very narrow and strict protocols if required.

Preferably, the method further comprises making the comparison by applying the index to a finite state machine defining a particular protocol, the finite state machine identifying an abstract pattern defined by the index and determining that the index is of the particular protocol if the identified abstract pattern is the same as that of the particular protocol.

The abstract pattern defined by the index is, in this embodiment, used to categorise and recognise the particular protocol.

Preferably, the abstract pattern defines the duration and level of pulse sequences at the start and end of the message transmitting signal, and identifies intermediate pulse sequences providing the bits defining the message.

The analysis method as defined above may be utilized in a method of producing a message transmitting signal, where the signal comprises a sequence of high level and low level pulses arranged to provide the message, the method of producing a message transmitting signal comprising using a finite state machine to define a protocol for the message, applying to that state machine information as to the bits defining a message, and causing the state machine to output the message with the particular protocol.

In the embodiments defined above, the message transmitting signals are defined as having a sequence of high level and low level pulses. The messages may be transmissable by any appropriate means, for example, by radio frequency transmissions. The message transmitting signals may also comprise pulse trains or bit patterns used in signal processing generally. The analysis methods are useful for any types of such messages having a variety of protocols and can be developed to enable storage of such messages in a space saving manner.

As set out above, the analysis method also enables a method for generating or producing such message transmitting signals. The state machines can be implemented in software and the signals generated automatically.

When storing messages, it is not necessary to store data relating to individual protocols strictly defining each message. As indicated above, an underlying protocol, categorising the protocols of a variety of messages can be stored in the form of a state machine.

The state machines, categorising the abstract patterns, are impervious to command length. This means that bit patterns having different numbers of bits can be classified in the same protocol category and be reproduced by the same state machine.

Although the defined methods are applicable generally to message transmitting signals having high and low level pulses, the methods are particularly applicable to the IR patterns used by remote control units.

IR patterns generated by remote control units are generally created by turning an oscillating LED on and off. In this case, the sequence of high level and low level pulses providing a message is a sequence in which the signal is alternately on and off.

According to a further embodiment of the invention there is provided a method of providing a universal remote control device comprising analysing the messages transmitted by each one of a plurality of individual, physical remote control units, the analysis being performed by a method as defined above, the method comprising categorising each message by its protocol, storing in the universal remote control device a plurality of finite state machines, each state machine defining a particular message protocol, and enabling the application of the bits defining a message to a selected state machine to generate a message having the particular protocol of the selected state machine.

The present invention also extends to a universal remote control device having a user interface, and transmission means for transmitting messages to electronic devices, the universal remote control device comprising processing means and associated memory, wherein, to enable the universal remote control device to provide messages to operate a plurality of electronic devices, a plurality of finite state machines are stored in memory, each state machine defining a particular protocol for messages and being arranged to output a message with a particular protocol in response to receiving bits defining that message.

In an embodiment, the remote control device is arranged to generate, rather than store, each message output for transmission, the message being generated by way of the processing means and a selected finite state machine.

Preferably, in response to operation of the user interface, bits defining a message are input to a selected state machine which is enabled to output a message transmitting signal having the particular protocol of the selected state machine, the output message comprising a sequence of high level and low level pulses.

In a preferred embodiment, the output message comprises an infrared bit pattern.

The output of infrared bit patterns from a universal remote control device of embodiments of the invention reflects the fact that the universal remote control device is to perform the functions of a plurality of remote control units. Existing remote control units use infrared transmissions to communicate with the electronic devices they control. However, if individual remote control units change their transmission means, this can be accommodated by universal remote control devices of the present invention.

BRIEF DESCRIPTION OF THE DRAWINGS

Embodiments of the present invention will hereinafter be described, by way of example, with reference to the accompanying drawings in which.

DETAILED DESCRIPTION

The present invention is described below specifically by reference to the provision of a universal remote control device able to output IR patterns. However, the analysis method described has utility for any message transmitting signals made up of a sequence of pulses. The analysis method can be used to categorise or recognise such signals, and can be utilised when storing such signals to limit the amount of storage necessary.

Embodiments of a universal remote control device of the invention are able to operate different electronic devices, such as television sets, recording devices such as VCRs and DVD recorders, set top boxes and satellite systems, and audio systems. The universal remote control device is also able to operate different manufacturers' versions of such devices. In one embodiment, for example, the universal remote control device is able to provide the functionality of 740 individual remote control units.

It will be appreciated that a universal remote control device implementing the invention may control as few or as many electronic devices as is commercially required, and may control as many or as few types of electronic devices as meets the needs of the marketplace.

A remote control unit communicates with the electronic device it controls by transmitting signals and, presently the majority of remote control units use infrared (IR) transmissions. However, the invention is not limited to the use of infrared transmissions and comprehends remote control units communicating with the electronic devices they control by any other suitable means, for example, by "Bluetooth"® or by radio frequency transmissions.

Figure 1:
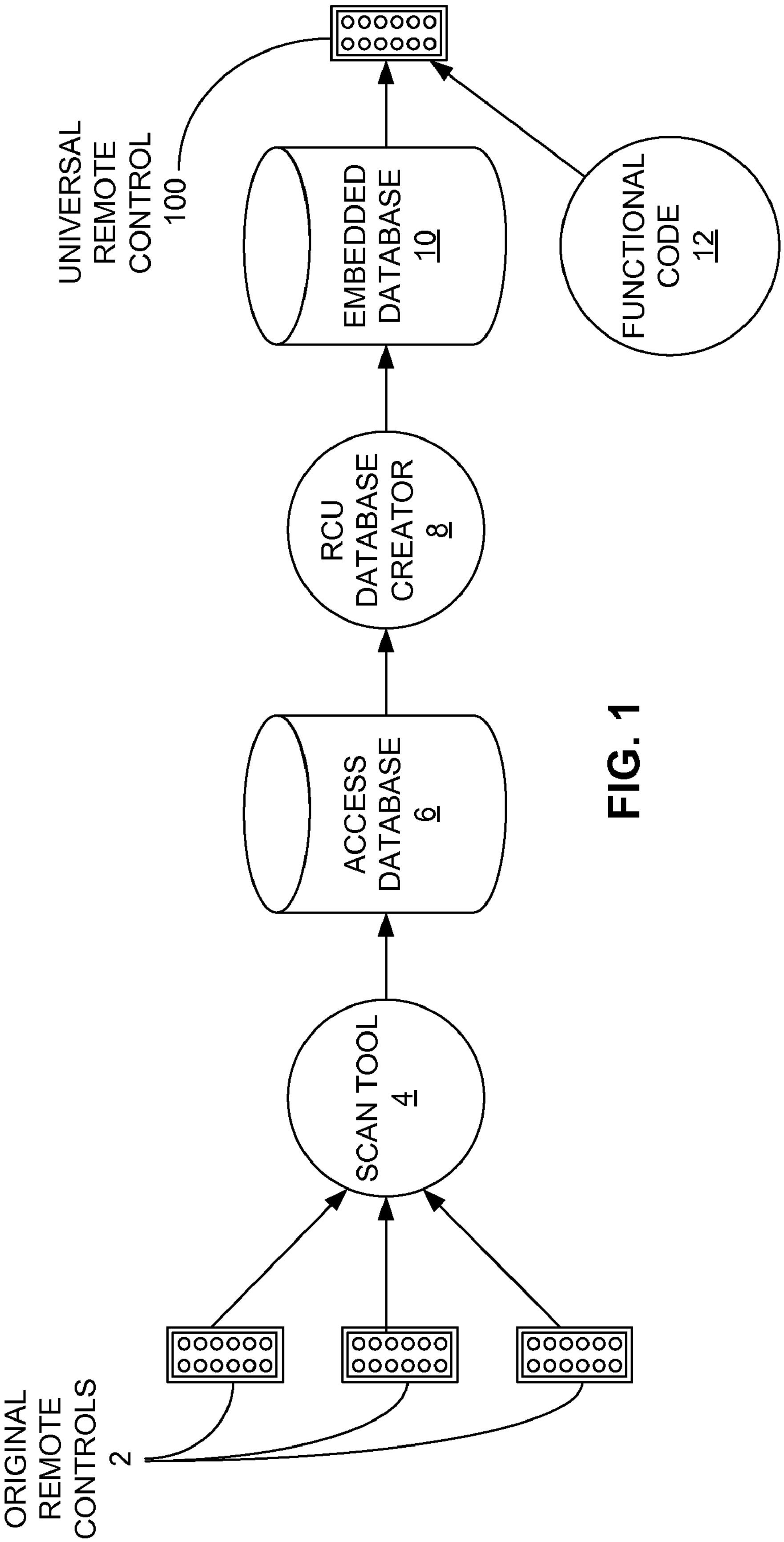
FIG. 1 illustrates schematically the provision of a universal remote control device having the functionality of a plurality of individual remote control units.

In our earlier European application No. 08165844.5 referred to above, we describe a universal control device having a particular database structure which enables a large amount of data to be stored in a small space, yet which makes access to that data easy and fast. FIG. 1 illustrates schematically the provision of a universal remote device 100 which is to be able to perform the functionality of a plurality of individual, physical remote control units 2.

FIG. 1 shows a database 10 formed from control data collected from the plurality of individual, physical remote control units 2. As shown, a scan tool 4 scans the control data of each of the individual remote control units 2 and places this data into an access database 6. A database creator 8 then retrieves and analyses the data in the access database 6, compresses it, structures it and places it in the embedded database 10. The database 10 is stored in memory in the universal remote control device 100. It will be seen that the universal control device 100 also has a processing unit indicated at 12. This processing unit is arranged to use the data in the embedded database 10 in response to the actuation of keys, indicated at 14 on the remote control device 100, so that appropriate signals are transmitted in response to the key actuation.

Figure 2:
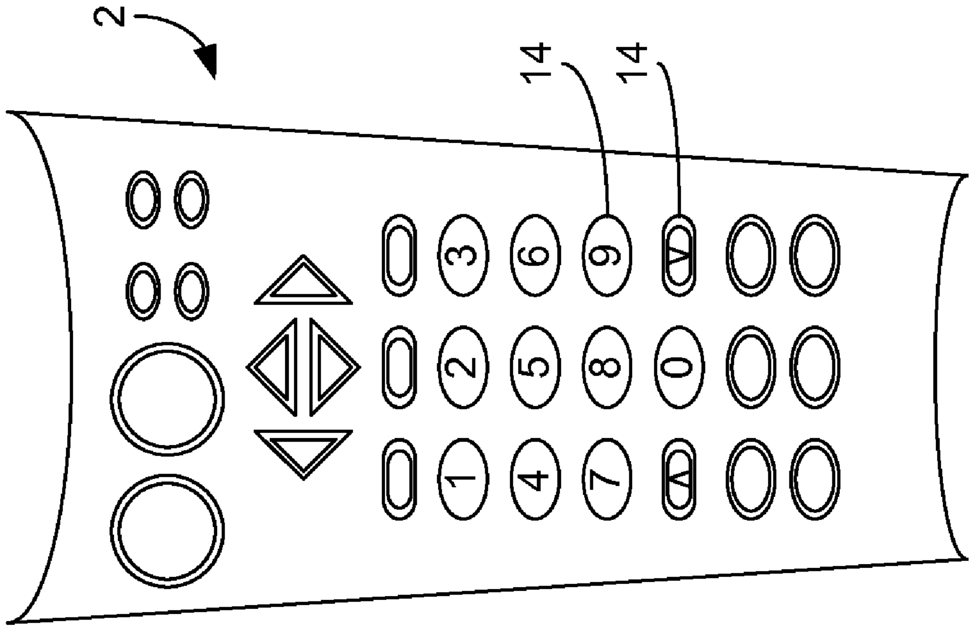
FIG. 2 shows an example of a physical remote control unit.

FIG. 2 shows one example of a physical remote control unit 2 having keys 14. As shown, and as is well known, each key 14 on the remote is named, numbered, or otherwise carries an indication of its function. The universal remote control device 100 will have a similar physical appearance and functionality.

Figure 3:
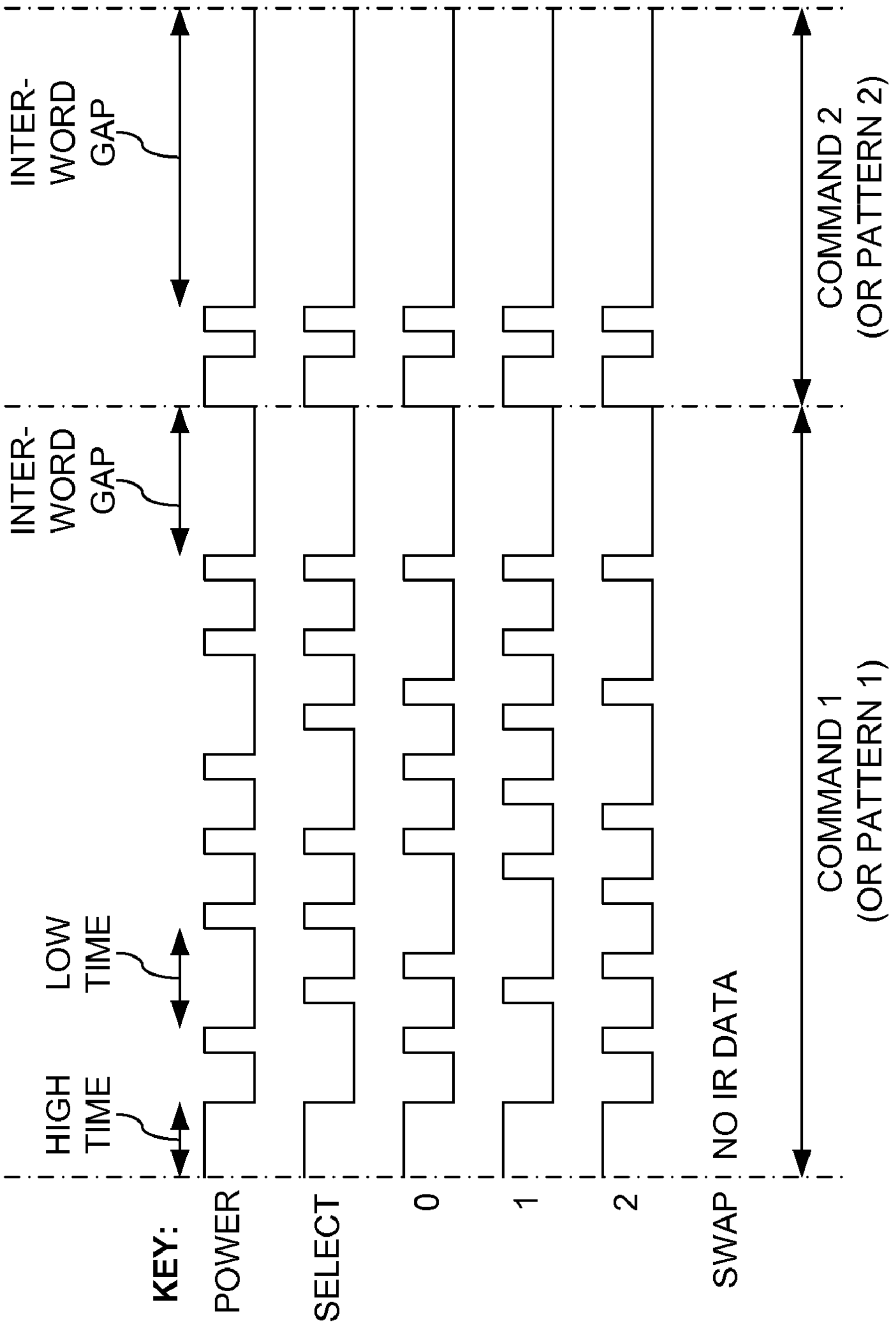
FIG. 3 shows examples of IR patterns transmitted by remote control units.

FIG. 3 shows examples of IR patterns which are transmitted by the remote control units 2 in response to the actuation of a key 14 by pressing it. FIG. 3 shows the IR pattern or command output from “Power” and “Select” keys, and from “0”, “1”, and “2” keys of a remote control unit, for example. FIG. 3 also reveals that a “Swap” key does not transmit an IR pattern.

It will be seen that each bit pattern or message in FIG. 3 comprises a sequence of high level and low level pulses. When the pattern is transmitting at a high level, an LED (not shown) in the remote control unit is usually lit. FIG. 3 also shows that an interword gap (IWG) is usually provided between successive commands.

Embodiments of this invention make it possible to classify the remote control IR patterns, whilst simultaneously extracting the messages from the patterns. This then makes it possible to reproduce the IR patterns in a universal remote control device without the need to store protocol specific code in the remote control device.

Figure 4A:
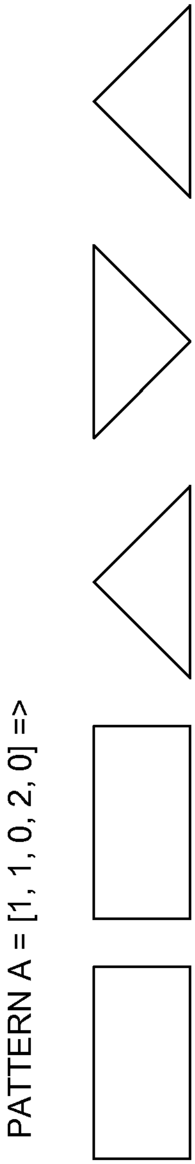
FIG. 4 shows a symbol table and FIGS. 4*a* and 4*b* show two patterns A and B formed from symbols in the symbol table.
Figure 4B:
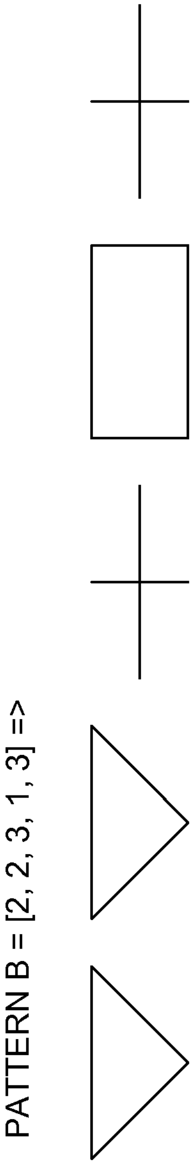
Figure 4:
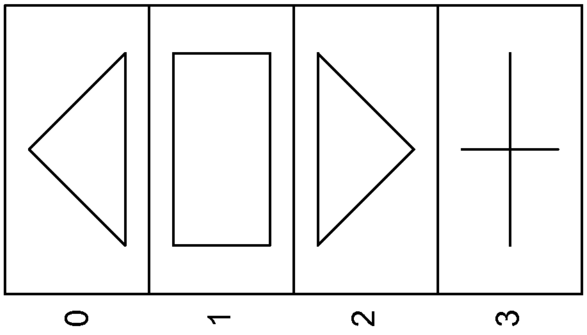

FIG. 4 shows a symbol table and FIGS. 4*a* and 4*b* show two patterns A and B formed from symbols in the symbol table. It will be seen that the patterns A and B of FIGS. 4*a* and 4*b* are very different. However, on an abstract level the two patterns A and B can be said to be the same as they each comprise two occurrences of a first symbol, followed by one occurrence of a second symbol different from the first, followed by one occurrence of a third, different, symbol, followed by one occurrence of the second symbol.

Figure 5A:
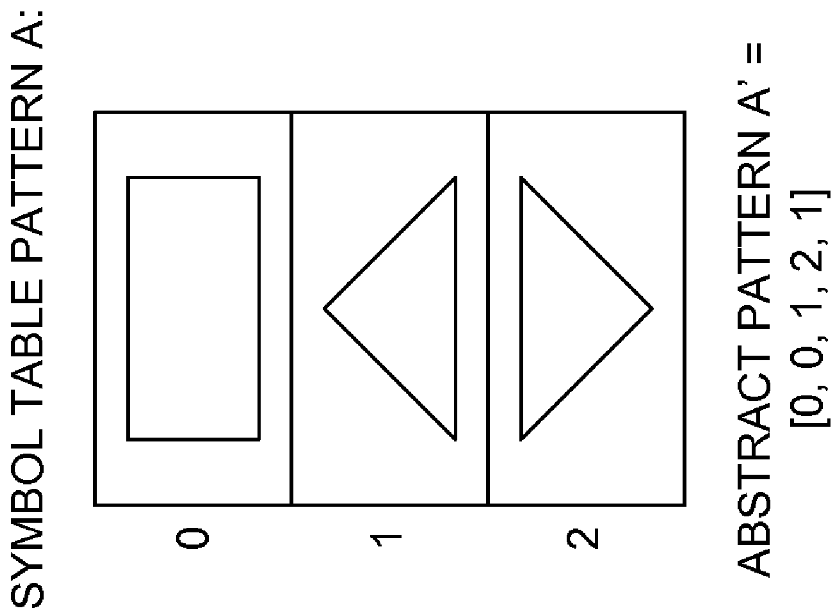
FIG. 5*a* shows a symbol table for pattern A of FIG. 4*a* together with an index for the pattern.
Figure 5B:
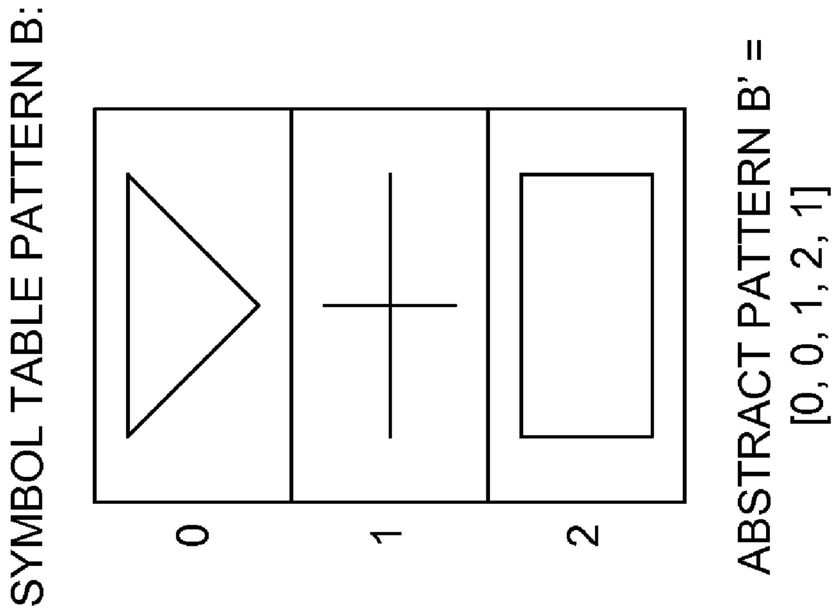
FIG. 5*b* shows a symbol table for pattern B of FIG. 4*b* together with an index for the pattern.

The patterns A and B of FIGS. 4*a* and 4*b* can be represented by a symbol table with an index for each pattern. This is shown in FIGS. 5*a* and 5*b* which show the symbol pattern for each of patterns A and B and then identify each pattern by reference to the index which identifies the order of the symbols. Thus, pattern A has an index table reading [0, 0, 1, 2, 1]. It will be seen that pattern B is represented by exactly the same index. The index tables for the two patterns A and B can be used to categorize the patterns and can be easily compared in software. Thus, two apparently disparate patterns, such as A and B, can be identified as having the same underlying schema, or protocol.

This technique can be used to analyse message transmitting signals. The symbols of FIGS. 5*a* and 5*b* can be replaced by the durations of high and low pulses.

Figure 6:
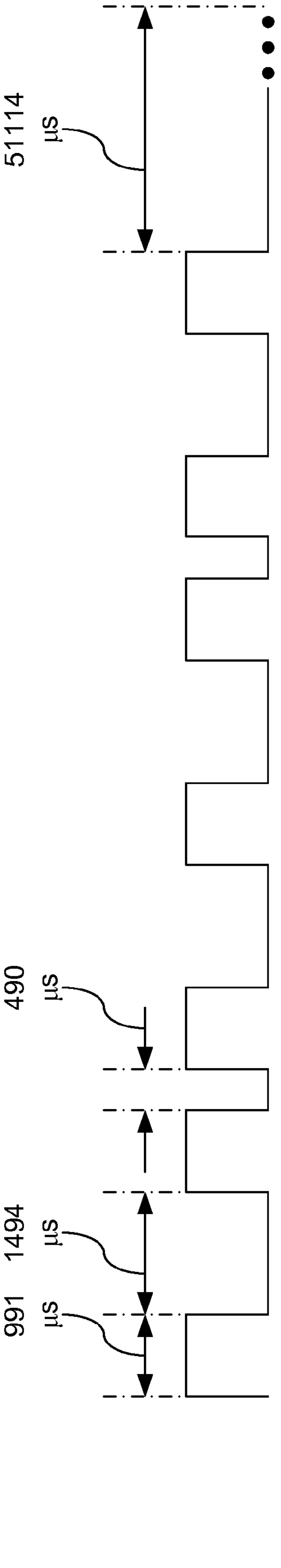
FIG. 6 shows one example of an IR pattern from a remote control unit on which the durations of the pulses at the high and low levels have been marked.

FIG. 6 shows one example of an IR pattern from a remote control unit on which the durations of the pulses at the high and low levels have been marked. It will be appreciated that this IR pattern is of the same type as those exemplified in FIG. 3. As is apparent, the IR pattern of FIG. 6 consists of a sequence of high and low level pulses, and the durations during which the pulses are high or low differ. Put another way, there are differences in the mark space ratio.

Figure 7:
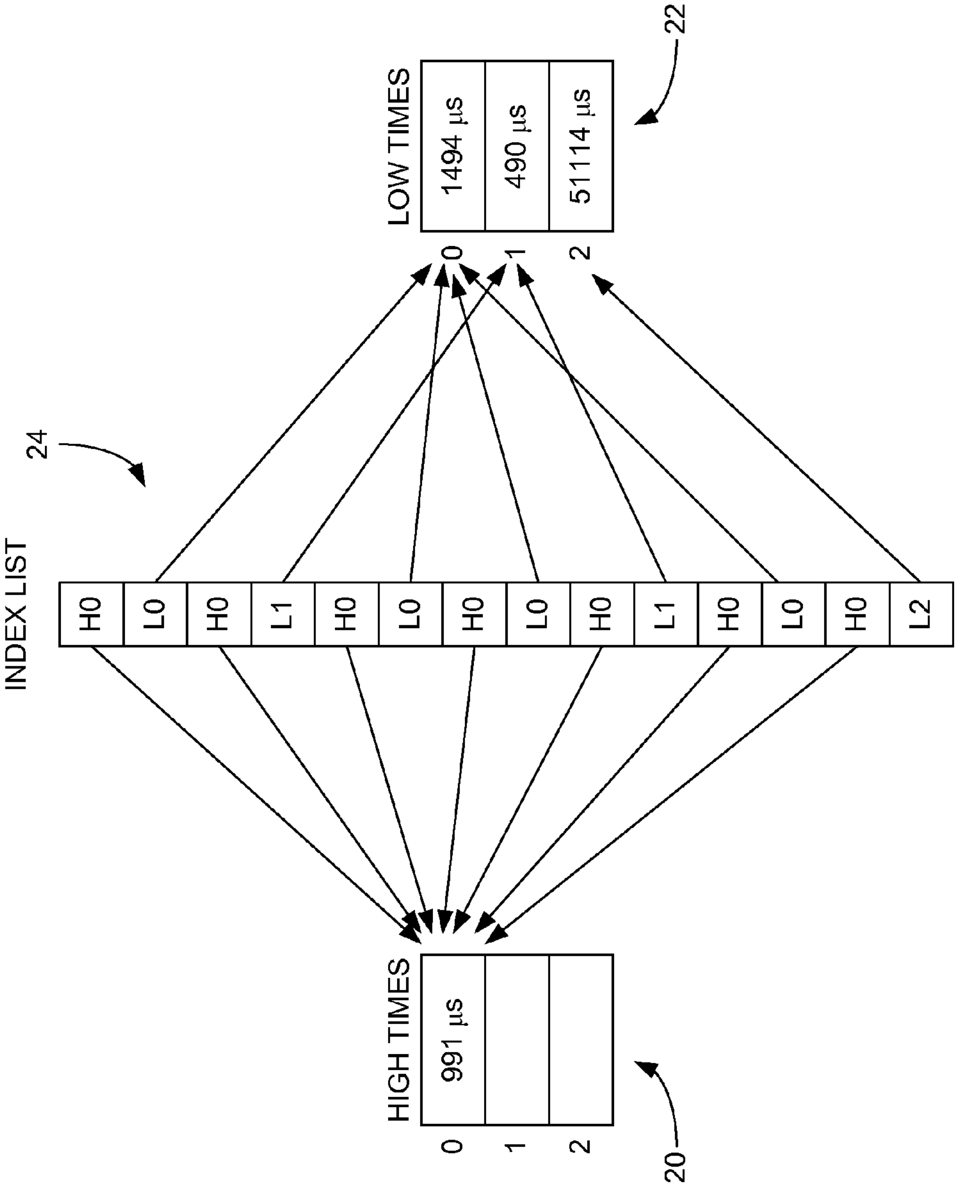
FIG. 7 shows a representation of the IR pattern of FIG. 6 using tables of pulse durations and an index.

To analyse a message transmitting signal as in FIG. 6, a scan is made through the pulse pairs and two tables are constructed. A first table 20 contains all of the distinct durations when the pulses are at the high level. A second table 22 contains all of the distinct durations during which the pulses are at the low level. These tables 20 and 22 are illustrated in FIG. 7, which shows an index 24 which is also constructed. The index 24 is linked to the first and second tables so that the original pulse train could be generated by traversing the index. The index will form the abstract pattern that will enable the signal to be categorised and recognised. In this manner it can be determined if the signal has a particular protocol.

FIG. 7 shows a representation of the IR pattern of FIG. 6 using tables of pulse durations and an index. It will be seen that FIG. 7 shows a high level pulse of duration of 991 us, followed by a low level pulse with a duration of 1494 us, followed by a high level pulse of 991 us etc as in the pulse sequence of FIG. 6.

The index list of FIG. 7 is not used to reconstruct the pulse sequence, but instead is used to test if the pulse train is one of a particular category or protocol. This is done by using the index 24 as an input string to a finite state machine. If the transition edges match the actual indexes in the index list, it is identified as belonging to a particular protocol.

Figure 8:
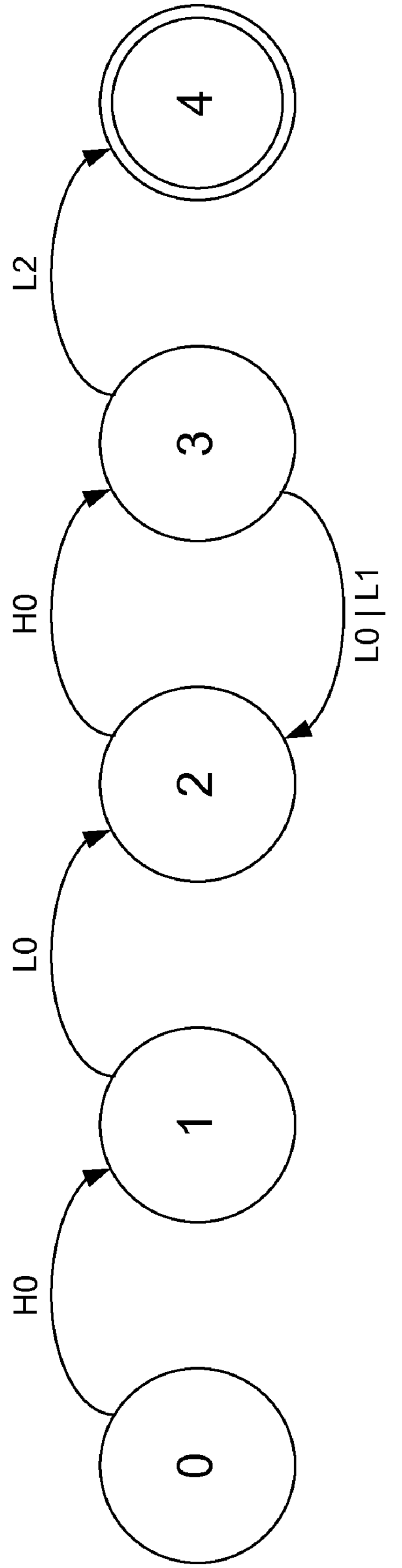
FIG. 8 is an automaton diagram representing the sequence of pulses of the IR pattern of FIG. 6.

FIG. 8 shows an automaton diagram representing the sequence of pulses exemplified in FIGS. 6 and 7. The format of FIG. 8, which represents the abstract pattern or protocol of the IR pattern of FIG. 6, will be familiar to those knowledgeable about state machines. FIG. 8 indicates the abstract pattern and shows that, in accordance with this protocol, the sequence of pulses begins with a pulse high H0, followed by a low pulse L0. These two pulses can then be followed by any number of high pulses H0 followed by L0, or by any number of high pulses H0 followed by L1. Finally the sequence must end with a pulse high H0 followed by a pulse low L2 to end in the final state. The bits, the 0s and 1s of the message carried, are produced at each transition from state 3 to state 2.

The actual durations of the high and low pulses are not considered to be part of the protocol or modulation technique and are therefore not part of the description set out in FIG. 8. So the protocol description will comprise:

the finite state machine, and the description of which edges in the finite state machine correspond to bits.

There are very many basic IR protocols, for example, which can be analysed and identified using this technique. For example, loose pulse position modulation uses different off times between fixed size pulses to encode for 0s and 1s. Pulse width modulation techniques, as is well known, encode the information to provide bits exclusively by varying the width of the pulses. Manchester coding can also be analysed and identified using this technique. The various modulation variants are outside the scope of this application but will be familiar to those skilled in the art.

Figure 9:
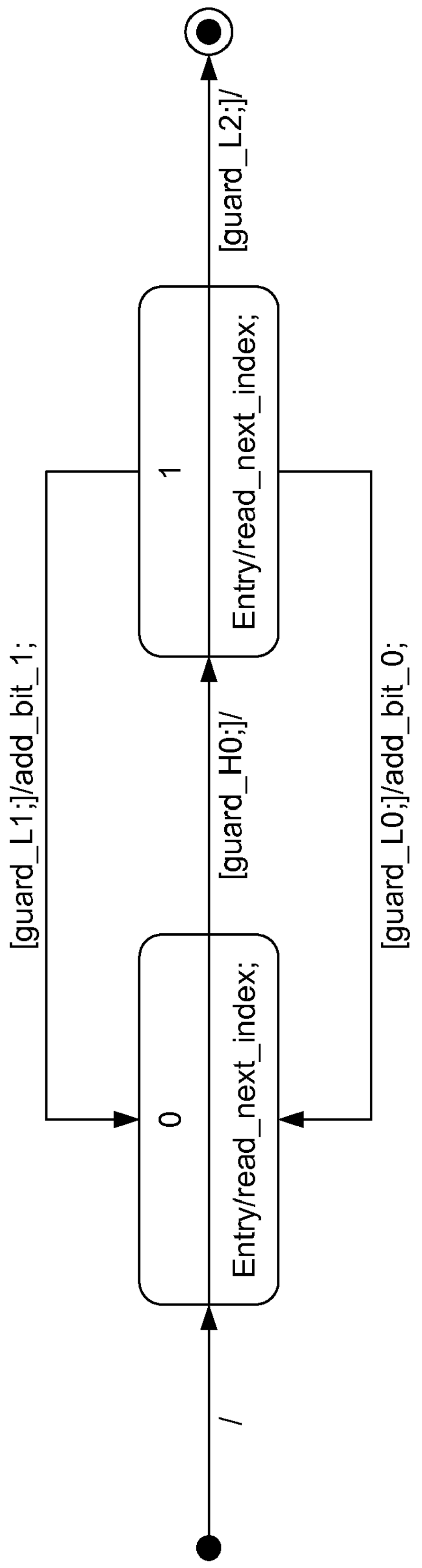
FIG. 9 indicates a finite state machine representing the sequence of pulses of the IR pattern of FIG. 6.

FIG. 9 shows the finite state machine which corresponds to the index of FIG. 7 and is illustrated by the automaton diagram in FIG. 8. It will be seen that the state machine of FIG. 9 shows how to generate the automaton diagram of FIG. 8.

We have seen that an IR pattern can be analysed to provide an index defining a particular protocol together with information in the form of a message defined by identified bits. These bits are the 0s and 1s generated by the transitions between states 3 and 2 in the diagram of FIG. 8. This can be utilised in the universal remote control device to generate specific IR patterns when required.

Figure 10:
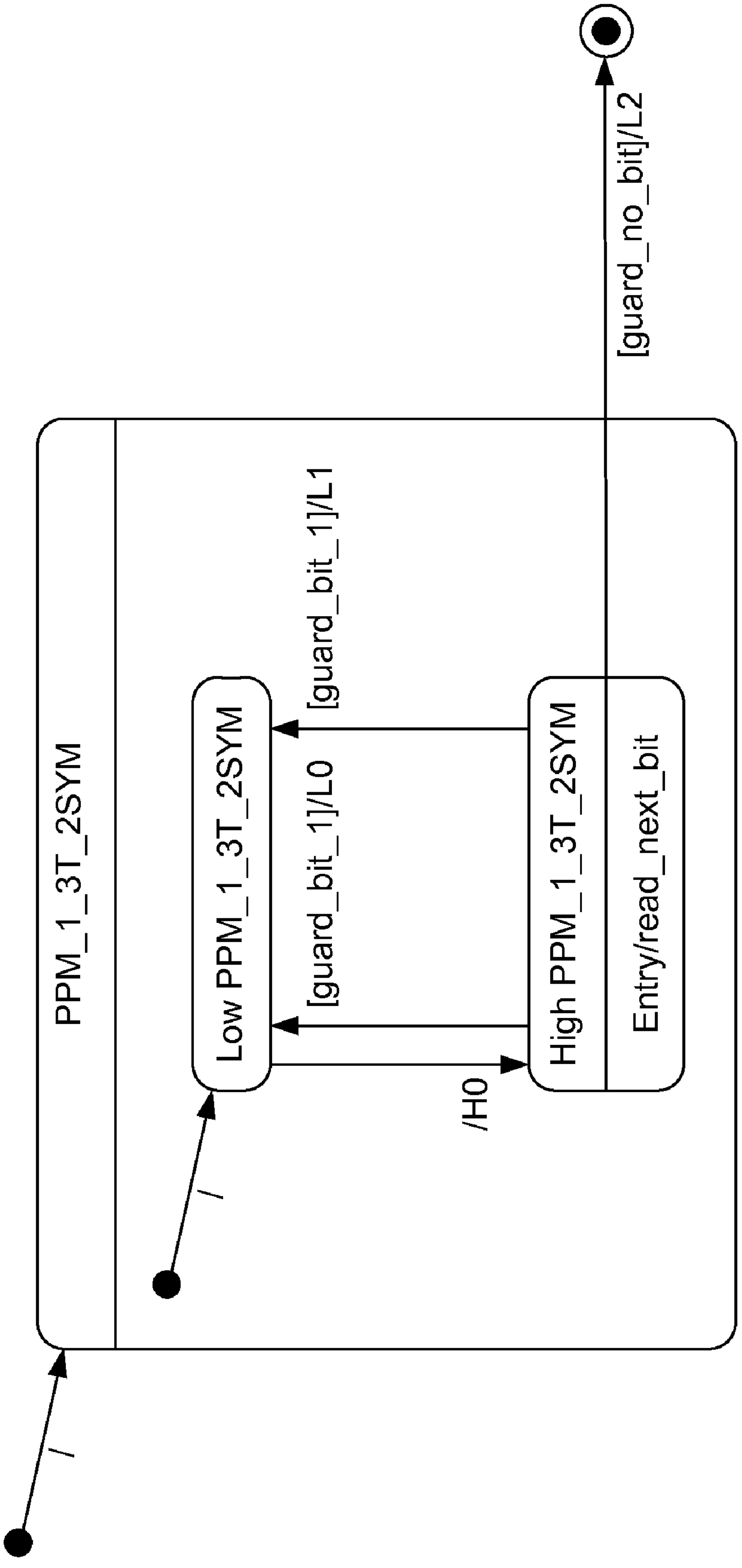
FIG. 10 shows an example of a finite state machine to be used in a universal remote control device to generate the IR pattern of FIG. 6.

FIG. 10 shows an example of a finite state machine which may be provided in memory in a universal remote control device in order to reproduce and output a particular IR pattern. FIG. 10 shows in Unified Modeling Language (UML) a radical finite state machine which, together with a description of which edges in the state machine correspond to bits, is able to produce a sequence of pulses.

The state machine mechanism of FIG. 10, is stored in software in the universal remote control device together with other state machine mechanisms. The example of FIG. 10 is to produce a sequence of pulses as shown in FIG. 6.

Each stored state machine in the universal remote control device represents a particular protocol. Then, in response to a user pressing a key of the remote control device, bits defining the message which is to be transmitted by that key press are input to a selected state machine which represents the particular protocol appropriate to the message. The appropriate output message, comprising a sequence of high level and low level pulses, is automatically generated.

The mechanism, including a plurality of state machines, for generating the output signals can be executed entirely automatically in response to user action. The state machines require that information identifying the messages to be output in response to key presses be stored, and hence a database compatible with the state machines is required. However, the provision of compatibility, and the provision of the necessary routines to automatically output the required messages is within the competence of those skilled in the art and is not further described herein.

Whilst the analysis and recognition technique described herein reduces the data it is needed to store in order to generate and output the required messages from a universal remote control device, it is preferably not used in isolation. The techniques herein are optimally utilised in conjunction with the compression and inheritance techniques described in our co-pending European patent application No. 08165844.5.

It will be appreciated that modifications and variations to the embodiments as illustrated and described may be made within the scope of this application.

The invention claimed is:

1. A method of analysing a message transmitting signal comprised of a sequence of high level and low level pulses arranged to provide a message, the method comprising:

tabulating information about the distinct durations during which the pulses are at the high and low levels to form a table of durations for the pulses, providing an index linked to the table to identify the order and distinct duration of the pulses in the message transmitting signal, and comparing the index to known indexes to determine the protocol of the message transmitting signal and to extract the specific bits defining the message, wherein comparing the index to known indexes comprises applying the index to a finite state machine defining a particular protocol, the finite state machine identifying an abstract pattern defined by the index and determining that the index is of the particular protocol if the identified abstract pattern is the same as that of the particular protocol.

2. A method of analysing a message transmitting signal as claimed in claim 1, further comprising:

tabulating the distinct durations during which the pulses are at the high level to form a first table of durations for high level pulses, tabulating the distinct durations during which the pulses are at the low level to form a second table of durations for low level pulses, and linking the index to the first and second tables to identify the order, level and distinct duration of the pulses in the message transmitting signal.

3. A method of analysing a message transmitting signal as claimed in claim 1, wherein the distinct durations which are tabulated have tolerances applied to the distinct durations.

4. A method of analysing a message transmitting signal as claimed in claim 1, wherein the abstract pattern defines the duration and level of pulse sequences at the start and end of the message transmitting signal, and identifies intermediate pulse sequences providing the bits defining the message.

5. A method of producing a message transmitting signal, the signal comprising a sequence of high level and low level pulses arranged to provide the message, the method comprising:

analysing the message by:

tabulating information about the distinct durations during which the pulses are at the high and low levels to form a table of durations for the pulses; and providing an index linked to the table to identify the order and distinct duration of the pulses in the message transmitting signal; and comparing the index to known indexes to determine the protocol of the message transmitting signal and to extract the specific bits defining the message by applying the index to a finite state machine defining a particular protocol, the finite state machine identifying an abstract pattern defined by the index and determining that the index is of the particular protocol if the identified abstract pattern is the same as that of the particular protocol;

using the finite state machine to define the protocol for the message;

applying to the finite state machine information as to the bits defining 25 the message; and causing the finite state machine to output the message with the particular protocol.

6. A method of providing a universal remote control device, the method comprising:

analysing each of the messages transmitted by each one of a plurality of individual, physical remote control units, by:

tabulating information about the distinct durations during which the pulses of the messages are at the high and low levels to form a table of durations for the pulses;

providing an index linked to the table to identify the order and distinct duration of the pulses in the message transmitting signal; and comparing the index to known indexes to determine the protocol of the message transmitting signal and to extract the specific bits defining the message by applying the index to a finite state machine defining a particular protocol, the finite state machine identifying an abstract pattern defined by the index and determining that the index is of the particular protocol if the identified abstract pattern is the same as that of the particular protocol;

categorizing each message by its protocol, storing in the universal remote control device a plurality of finite state machines, each state machine defining a particular message protocol; and enabling the application of the bits defining a message to a selected state machine to generate a message having the particular protocol of the selected state machine.

7. A universal remote control device comprising:

a user interface;

a transmitter configured to transmit messages to electronic devices;

a processor coupled to the user interface and the transmitter; and memory associated with the processor;

wherein, to enable the universal remote control device to provide messages to operate a plurality of electronic devices, a plurality of finite state machines are stored in the memory, each state machine defining a particular protocol for messages, wherein messages transmitted by each one of a plurality of individual physical remote control units have been analysed to determine the protocol of each message transmitting signal and to extract the specific bits defining each message, wherein an index identifying the order and distinct duration of the pulses in each message transmitting signal has been applied to a finite state machine whereby the finite state machine has determined the particular protocol for each message, and wherein each finite state machine is arranged to output a message with a particular protocol in response to receiving bits defining that message.

8. A universal remote control device as claimed in claim 7, wherein the remote control device is arranged to generate, rather than store, each message output for transmission, the message being generated by way of the processor and a selected finite state machine.

9. A universal remote control device as claimed in claim 7, wherein, in response to operation of the user interface, bits defining a message are input to a selected state machine which is enabled to output a message transmitting signal having the particular protocol of the selected state machine, the output message comprising a sequence of high level and low level pulses.

10. A universal remote control device as claimed in claim 9, wherein the output message comprises an infrared bit pattern.

11. A method of analysing a message transmitting signal comprised of a sequence of high level and low level pulses arranged to provide a message, the method comprising:

tabulating information about the distinct durations during which the pulses are at the high and low levels to form a table of durations for the pulses, providing an index linked to the table to identify the order and distinct duration of the pulses in the message transmitting signal, tabulating the distinct durations during which the pulses are at the high level to form a first table of durations for high level pulses, tabulating the distinct durations during which the pulses are at the low level to form a second table of durations for low level pulses, and linking the index to the first and second tables to identify the order, level and distinct duration of the pulses in the message transmitting signal.

12. A method of analysing a message transmitting signal comprised of a sequence of high level and low level pulses arranged to provide a message, the method comprising:

tabulating information about the distinct durations during which the pulses are at the high and low levels to form a table of durations for the pulses, and providing an index linked to the table to identify the order and distinct duration of the pulses in the message transmitting signal, wherein the distinct durations which are tabulated have tolerances applied to the distinct durations.

13. A universal remote control device comprising:

a user interface;

a transmitter configured to transmit messages to electronic devices;

a processor coupled to the user interface and the transmitter; and memory associated with the processor;

wherein, to enable the universal remote control device to provide messages to operate a plurality of electronic devices, a plurality of finite state machines are stored in the memory, each state machine defining a particular protocol for messages and being arranged to output a message with a particular protocol in response to receiving bits defining that message;

wherein the remote control device is arranged to generate, rather than store, each message output for transmission, the message being generated by way of the processor and a selected finite state machine.

14. A universal remote control device comprising:

a user interface;

a transmitter configured to transmit messages to electronic devices;

a processor coupled to the user interface and the transmitter; and memory associated with the processor;

wherein, to enable the universal remote control device to provide messages to operate a plurality of electronic devices, a plurality of finite state machines are stored in the memory, each state machine defining a particular protocol for messages and being arranged to output a message with a particular protocol in response to receiving bits defining that message;

wherein, in response to operation of the user interface, bits defining a message are input to a selected state machine which is enabled to output a message transmitting signal having the particular protocol of the selected state machine, the output message comprising a sequence of high level and low level pulses.

* * * * *